(12) United States Patent
Kasprick et al.

(10) Patent No.: US 6,658,601 B1
(45) Date of Patent: Dec. 2, 2003

(54) METHOD AND APPARATUS FOR MONITORING A PROCESS THAT PROCEEDS AUTOMATICALLY TO ENSURE THAT IT IS EXECUTED PROPERLY

(75) Inventors: Kai Kasprick, Dresden (DE); Ernst-Josef Kock, Kirchseeon (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/531,205

(22) Filed: Mar. 20, 2000

Related U.S. Application Data

(63) Continuation of application No. PCT/DE98/02626, filed on Sep. 7, 1998.

(30) Foreign Application Priority Data

Sep. 18, 1997 (DE) .......................................... 197 41 168

(51) Int. Cl.[7] .............................................. G06F 11/00
(52) U.S. Cl. .......................................... 714/37; 714/47
(58) Field of Search ....................... 700/78, 80; 714/37, 714/39, 47, 48, 25, 26, 375, 57, 44, 27

(56) References Cited

U.S. PATENT DOCUMENTS 3,899,665 A    8/1975  Gaon
5,444,859 A  *  8/1995  Baker et al. ................ 395/575
5,737,522 A  *  4/1998  Matsumoto ............ 395/185.02

OTHER PUBLICATIONS

Yoshikawa et al., Abnormality monitoring device using watchdog timer, Sep. 19, 1997, JPAB, Pub–No. JP409244923A.*
Tetsuyoshi, Controller with time monitor, Jan. 31, 1986, Pub–no. JP361023258A.*
Hitachi LTD, Abnormality monitoring apparatus using watchdop timer–initialises register correcponding to total time required for time out process of control task and reduce total time based on termination of control task, Sep. 19, 1997, DWPI, Pub–No. JP09244923A.*
Patent Abstracts of Japan No. 60–191340 (Shozo), dated Sep. 28, 1985.
"Sequential Control System" (Baldwin et al.), IBM Technical Disclosure Bulletin, vol. 16, No. 12, May 1974.

* cited by examiner

*Primary Examiner*—Nadeem Iqbal
(74) *Attorney, Agent, or Firm*—Laurence A. Greenberg; Werner H. Stemer; Gregory L. Mayback

(57) ABSTRACT

A method and an apparatus for monitoring a process that proceeds automatically to ensure that it is executed properly. The method and the apparatus are distinguished in that one or more error signals signaling errors are generated at the beginning of the monitored process, and in that the generation of the respective error signal is discontinued if the error that is intended to be indicated by the relevant error signal has not occurred.

11 Claims, 3 Drawing Sheets

METHOD AND APPARATUS FOR MONITORING A PROCESS THAT PROCEEDS AUTOMATICALLY TO ENSURE THAT IT IS EXECUTED PROPERLY

CROSS-REFERENCE TO RELATED APPLICATION

This is a continuation of copending International Application PCT/DE98/02626, filed Sep. 7, 1998, which designated the United States.

BACKGROUND OF THE INVENTION

Field of the Invention

The present invention relates, in general, to a method and an apparatus for monitoring a process that proceeds automatically to ensure that it is executed properly.

The proper execution of any kind of process that proceeds automatically is understandably the goal that is sought in any development in this field. This applies especially to integrated circuits because extremely small errors can have disastrous effects therein.

Endeavors to enable the proper execution of technical processes that proceed automatically are increasingly successful in that errors occur less and less often. Experience shows, however, that it has not yet become possible to enable such processes to proceed entirely without errors under all circumstances. There is a need therefore for suitable methods and devices that can at least identify errors that possibly occur.

SUMMARY OF THE INVENTION

It is accordingly an object of the invention to provide a method and a device for monitoring processes which overcomes the hereinafore-mentioned disadvantages of the heretofore-known methods and devices of this general type in such a way that errors that can possibly occur during the execution of processes that proceed automatically can be reliably identified in a simple manner.

With the foregoing and other objects in view there is provided, in accordance with the invention, a method for monitoring an automatically proceeding process to ensure that the process is properly executed. At the beginning of a monitored automatically proceeding process, at least one error signal is generated for indicating an error. Generation of the error signal is discontinued if the error associated with or intended to be indicated by the error signal has not occurred.

Since the error signals indicating errors have to be actively reset in order to indicate that the monitored process is proceeding or progressing properly, it is extremely unlikely that a signal will not be provided for an error that has occurred. Any errors present in the error signal generating devices that generate the error signals can be identified rapidly and simply, in particular, at the beginning of the process to be monitored (at this point in time all of the error signals must signal errors).

The signaling of errors that can possibly occur is therefore reliable to an extremely high degree.

If a plurality of error signals are provided that are assigned to different stages of the monitored process, errors that can possibly occur can be specified according to type and extent. As a result of which, measures can be implemented as required in a targeted manner in order to eliminate the error that has occurred or to eliminate its effect. This applies especially if the error signals have to be reset in a specific order and/or at specific time intervals in the case where the monitored process is executed properly. Independently of this, errors that possibly occur can also be identified even during the process to be monitored.

With the foregoing and other objects in view there is provided, in accordance with the invention, an apparatus for monitoring an automatically proceeding process to ensure that the process is properly executed. The apparatus includes an error signal generator configured to generate, at the beginning of a monitored automatically proceeding process, at least one error signal to indicate an error. The error signal generator is configured to discontinue generating the error signal if the error intended to be indicated by the error signal has not occurred.

Other features which are considered as characteristic for the invention are set forth in the appended claims.

Although the invention is illustrated and described herein as embodied in a method and apparatus for monitoring a process that proceeds automatically to ensure that it is executed properly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The process whose monitoring is described in more detail below is the programming and/or erasing process in a flash EPROM integrated in a microcontroller. Such so-called embedded flash memories or flash modules are becoming increasingly widespread in particular because of the flexible and diverse possibilities relating to their use. Such memories are programmed and erased largely independently of the addressing unit (the control section of the microcontroller). It suffices for the programming or erasing to be initiated via an appropriately designed interface. The programming or erasing process is controlled in response to such external initiation by the flash module itself, more precisely a flash module control unit thereof.

It should be pointed out that the flash memory whose programming and/or erasing is intended to be monitored need not necessarily be part of a microcontroller or the like. A flash memory accommodated elsewhere or a separate flash memory may also be involved.

By virtue of the above-described monitoring of the programming and erasing of the flash memory, it is possible to detect errors in the flash module control unit and errors in the unit that addresses the flash module (the control section of the microcontroller, a CPU or the like). Errors in the unit that addresses the flash module are, for example, resetting of the flash module control unit during the programming and/or erasuring process.

Figure 1:
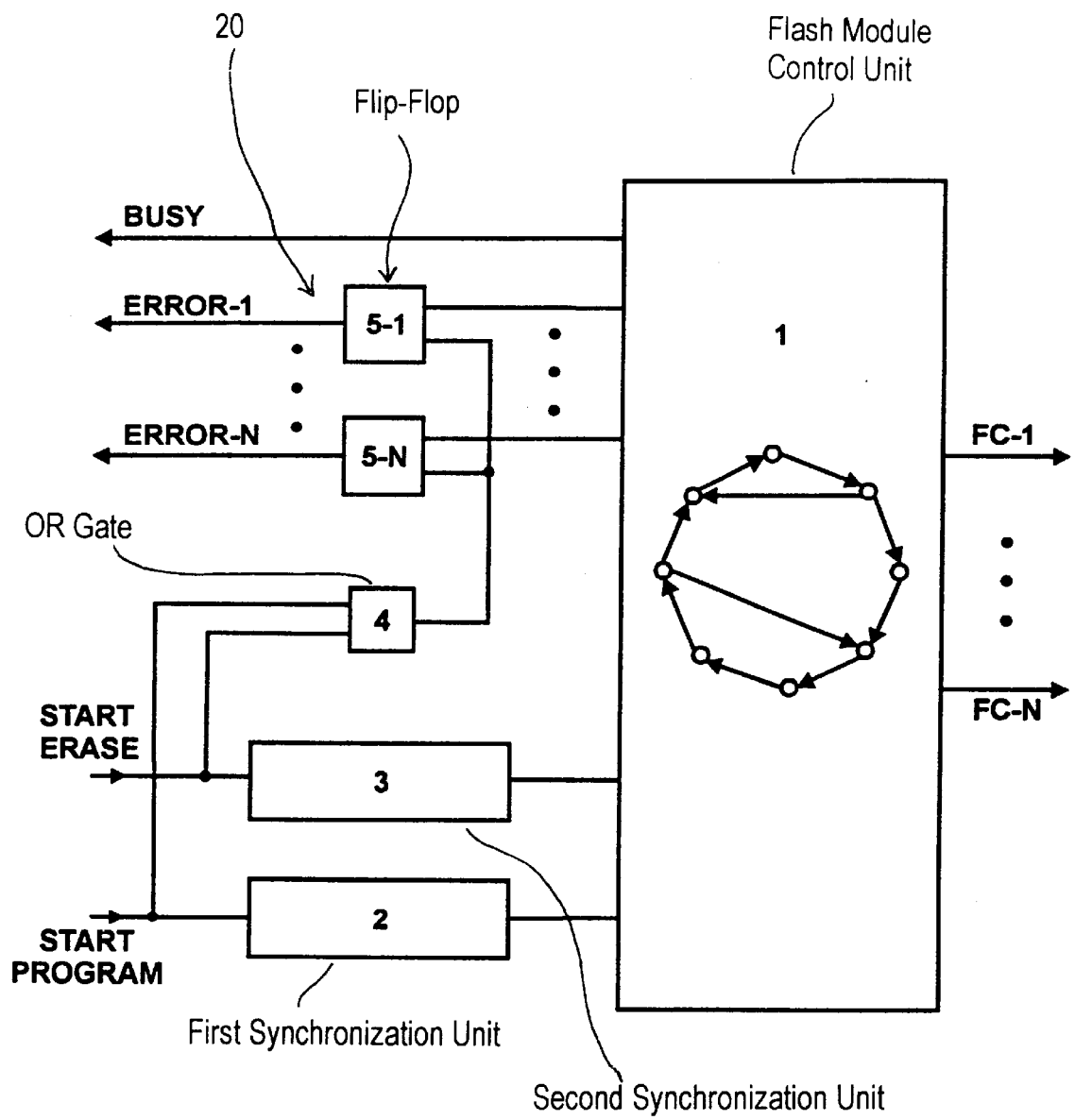
FIG. 1 shows the basic structure of a configuration for monitoring an automatically proceeding process to ensure that it is executed properly.

Referring to the figures of the drawing in detail and first, particularly, to FIG. 1 thereof, there is shown one possible structure of a configuration for monitoring the programming and/or erasing process.

The configuration includes a flash module control unit 1, a first synchronization unit 2, a second synchronization unit 3, an OR gate 4, and N (bi-stable) flip-flops 5-1 to 5-N, these units being interconnected as shown in FIG. 1.

The configuration in accordance with FIG. 1 is designed for inputting an erasing start signal START ERASE and a programming start signal START PROGRAM and for outputting of flash memory control signals FC-1 to FC-N, error signals ERROR-1 to ERROR-N, and an acknowledgement signal BUSY.

A programming or erasing process is started in response to the input of the programming start signal START PROGRAM or, respectively, of the erasing start signal START ERASE, which, in the example considered, may be realized by a pulse provided on the programming-start or erasing-start line. This pulse, which is output as required by the control unit addressing the flash module, is synchronized with the internal clock signal of the flash module control unit 1 by the assigned first or second synchronization unit 2 or 3, respectively, and forwarded to the flash module control unit 1 where it triggers the start of a respective programming or erasing process. The start pulse on the programming-start or erasing-start line is furthermore fed via the OR gate 4 to the flip-flops 5-1 to 5-N and causes the latter to be put into a state in which the output signals, namely, the error signals ERROR-1 to ERROR-N of the flip-flops 5-1 to 5-N signal an error. As will be described in more detail below, the error signals ERROR-1 to ERROR-N can also be reset again by the flip-flops 5-1 to 5-N. Therefore, the flip-flops 5-1 to 5-N act as an error signal generating device 20.

In response to receiving the programming-start or erasing-start signal, the flash module control unit 1 outputs the acknowledgement signal BUSY and in this way signals to the outside that a programming or erasing process is currently taking place.

The flash control unit 1 behaves like a so-called state machine. In other words, it proceeds from a base state and runs through specific further states in a specific order, in order to finally return to the base state again. The individual states correspond to different stages of the programming or erasing process.

The individual states or selected states are assigned to the error signals ERROR-1 to ERROR-N. These error signals, which 20 are set at the beginning of the programming or erasing process, are reset if the relevant stages of the process are executed without any errors. For this purpose, the flash module control unit 1 is connected to the flip-flops 5-1 to 5-N which act as an error signal generating device 20. The first flip-flop 5-1 and thus also the error signal ERROR-1 output by the first flip-flop 5-1 are reset if the assigned first stage of the programming or erasing process has been executed without any errors. A second flip-flop 5-2 and thus also a second error signal generated by the second flip-flop 5-2 are reset if the assigned second stage of the programming or erasing process has been executed without any errors. The n-th flip-flop 5-N and thus also the error signal ERROR-N generated by the n-th flip-flop 5-N are reset if the assigned n-th stage of the programming or erasing process has been executed without any errors.

If the entire programming or erasing process has been performed properly through to the end, all of the error signals ERROR-1 to ERROR-N are reset. The situation where all of the error signals are reset provides an indication that the programming or erasing process has been performed properly. What is to be classified as "error-free" or "proper" performance can be defined differently depending on the individual characteristics of the process to be monitored. The classification as error-free or proper can, in certain cases, already be effected if the relevant stage of the process to be monitored has been reached. However, it can also be effected only if the relevant stage has been run through up to a specific point and/or if specific conditions are fulfilled during the execution of the stage. Accordingly, the instants at which the error signal generating device 20 (the flip-flops 5-1 to 5-N) is prompted to reset the error signals ERROR-1 to ERROR-N also differ or vary.

Unless all of the stages for which error signals can be generated are run through during the process of erasing and/or programming, the error signals for those stages that are not to be run through in the course of the monitored process must be left out of consideration during the evaluation of the error signals.

As an alternative, it may be provided that selectively only those error signals which are assigned to the stages that are to be subsequently run through are set at the beginning of the process to be monitored.

The flip-flops 5-1 to 5-N are realized as RS flip-flops in the configuration shown in FIG. 1. However, it is also possible to use master-slave flip-flops. A practical example of an error signal generating device 20' constructed from master-slave flip-flops is shown in FIG. 2.

Figure 2:
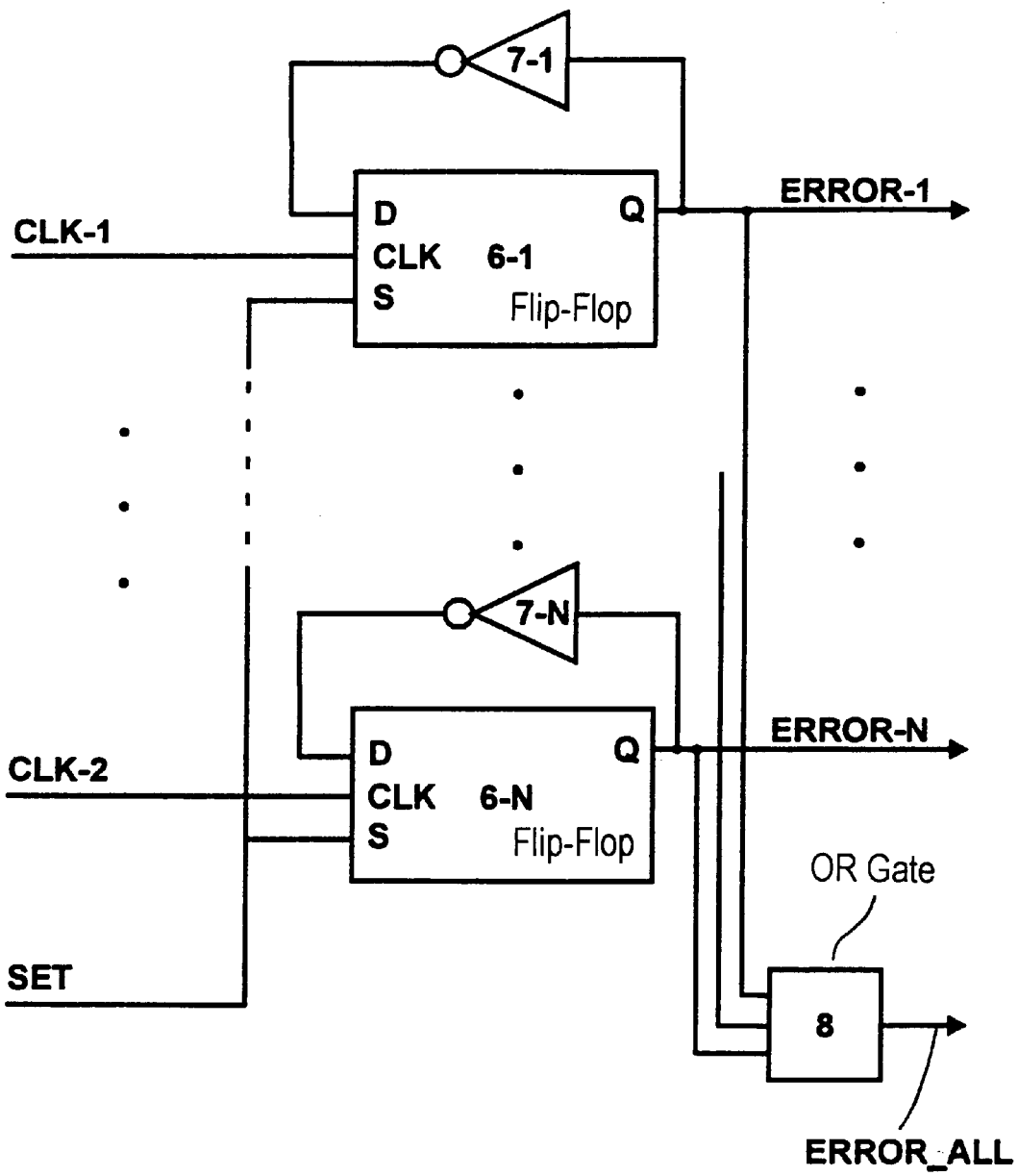
FIG. 2 shows the structure of an alternative to the error signal generating device contained in the configuration in accordance with FIG. 1.

The master-slave flip-flops are designated by the reference symbols 6-1 to 6-N in FIG. 2. The flip-flops 6-1 to 6-N act as an error signal generating device 20' like the flip-flops 5-1 to 5-N shown in FIG. 1. Their output signals again represent the error signals ERROR-1 to ERROR-N.

The flip-flops 6-1 to 6-N are set by a common signal SET which may be the programming-start or erasing-start signal. The signal SET is applied to the respective inputs S of the flip-flops 6-1 to 6-N. The output signal at each output terminal Q of the flip-flops 6-1 to 6-N becomes a "1" as a result of the signal SET. Thus, the output signal at each output terminal Q signals an error in the assigned stage of the process to be monitored.

As soon as a stage of the monitored process which has a respective flip-flop assigned thereto can be classified as having been executed without any errors or executed properly, a signal that indicates this execution is generated by the flash module control unit 1. The signal is applied to the clock signal input CLK of the assigned flip-flop. As long as a respective flip-flop receives such a clock signal, its switching state can be altered via its D input. The output signals ERROR-1 to ERROR-N of the flip-flops 6-1 to 6-N are inverted by inverters 7-1 to 7-N and are then applied to the respective D inputs.

After the initial setting of the flip-flops 6-1 to 6-N, the error signals ERROR-1 to ERROR-N have the value "1", as a result of which signals having the value "0" are present at the D inputs. If the monitored process reaches the stage to which a relevant flip-flop is assigned, then this flip-flop, given proper execution of the relevant stage, is put into a state of switching readiness by the respective one of the clock signal s CLK-1 . . . CLK-N input into the input CLK of the relevantly assigned flip-flop. Since a signal "0" is present at the D input, the relevant flip-flop switches the output Q over from "1" to "0", which thus signals to the outside that everything is proceeding properly in the assigned stage. As a result of the error signal switching over from "1" to "0", a signal "1" appears at the D input. However, the signal does not effect a renewed switch-over of the relevant flip-flop.

The error signals ERROR-1 to ERROR-N of all the flip-flops 6-1 to 6-N can be input into an OR gate 8, which executes a logic OR function and outputs a common error signal ERROR-ALL. The error signal ERROR-ALL has the value "1" if one or more of the error signals ERROR-1 to ERROR-N have not been reset, that is to say errors occurred in one or more stages of the monitored process. Insofar as the stage or stages in which the error or errors occurred is or are of interest, the individual error signals ERROR-1 and ERROR-N can or must be additionally or alternatively evaluated. Combination of the individual error signals ERROR-1 to ERROR-N to form a common error signal ERROR-ALL which takes place in the manner described or in a similar manner can also be applied to an error signal generating device that is constructed differently (including, inter alia, the error signal generating device shown in FIG. 1).

Figure 3:
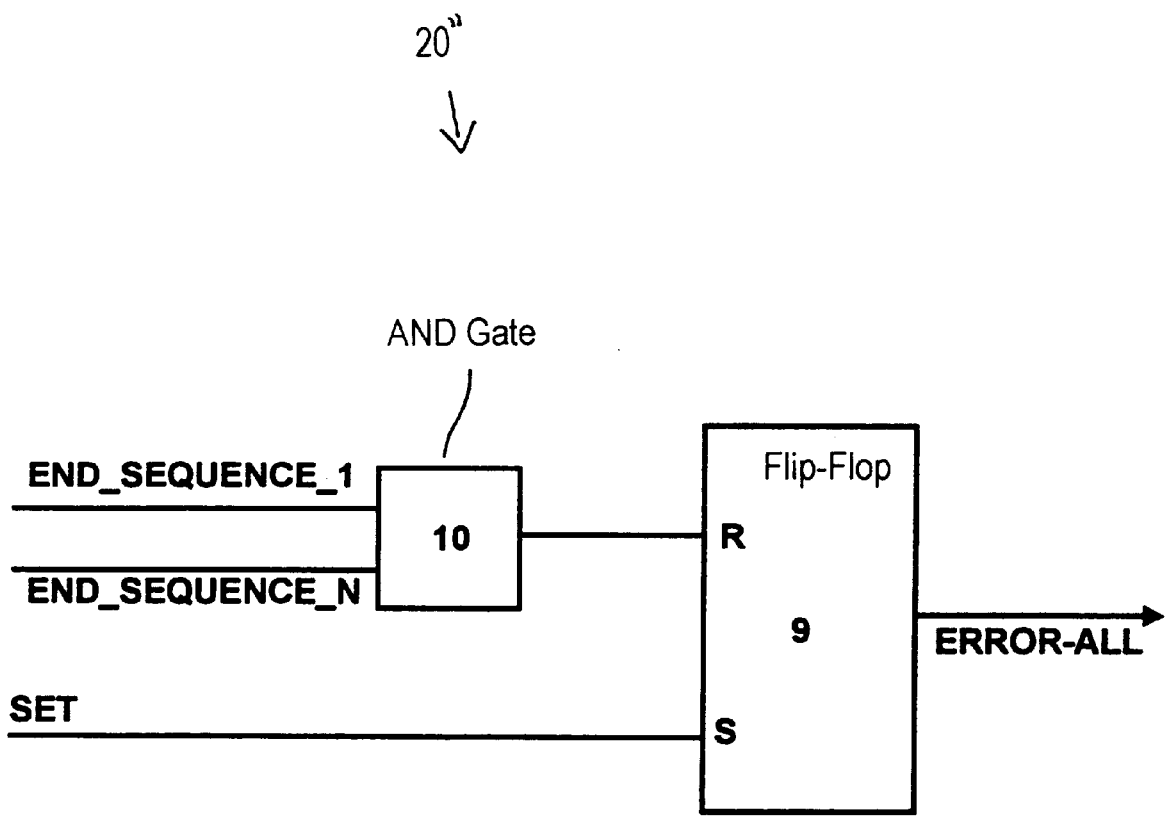
FIG. 3 shows the structure of a further alternative to the error signal generating device contained in the configuration in accordance with FIG. 1.

The many flip-flops 5-1 to 5-N or 6-1 to 6-N, whose number corresponds to the number of monitored stages in the process, can, under certain circumstances, be replaced by a single flip-flop. An exemplary embodiment of an error signal generating device 20" which manages with a single flip-flop is illustrated in FIG. 3.

This one flip-flop is an RS flip-flop designated by the reference symbol 9. The flip-flop 9 is set similar to the flip-flops 5-1 to 5-N shown in FIG. 1 and the flip-flops 6-1 to 6-N shown in FIG. 2. Prior to the beginning of the monitored process, the flip-flop 9 is set by a set signal SET, which, by way of example, may be the programming-start signal PROGRAM-START or the erasing-start signal ERASE-START. If and as long as the flip-flop 9 is set it signals, by means of an output or error signal ERROR-ALL, to the outside that there is an error in the monitored process. The flip-flop 9 is reset if all the stages of the process to be monitored have been run through to the end. For this purpose, the flash module control unit 1 outputs (stage-end) signals END_SEQUENCE_1 to END SEQUENCE_N, which each signal that the relevant stages 1 to N have been run through to the end. The signals END_SEQUENCE_1 to END_SEQUENCE_N are input into an AND-gate 10, whose output signal is simultaneously the reset signal for the flip-flop 9. The effect of the AND gate 10 is that the flip-flop 9 can be reset only when all the stages of the monitored process have been run through to the end. Such a way or a similar way of combining or logically combining the signals that prompt the reset of the error signals can also be used in the configurations shown in FIGS. 1 and 2 and in other configurations.

It should be apparent that the flip-flop configurations described above are far from being the only possibilities for performing monitoring, effected in the manner described above, of a process that proceeds automatically. The configurations described are only individual examples for illustrating the basic principle. They are in no way an exhaustive enumeration of all equivalent or comparable alternatives.

Although the exemplary embodiments that have been described are each designed for monitoring programming and/or erasing of a flash memory, the application of the fundamental monitoring principle is not restricted to this. The fundamental monitoring principle can also be used for monitoring any other processes that proceeds automatically.

We claim:

1. A method for monitoring an automatically proceeding process to ensure that the process is properly executed, which comprises:

at the beginning of a monitored automatically proceeding process, generating at least one error signal for indicating an error, even if there is no error; and discontinuing to generate the error signal if the error to be indicated by the error signal has not occurred.

2. The method according to claim 1, which comprises:

associating the error signal with a stage of the monitored process; and discontinuing to generate the error signal if execution of the stage of the monitored process has begun.

3. The method according to claim 1, which comprises:

associating the error signal with a stage of the monitored process; and discontinuing to generate the error signal if the stage of the monitored process has been run up to a particular point.

4. The method according to claim 1, which comprises:

associating the error signal with a stage of the monitored process; and discontinuing to generate the error signal if specific conditions are fulfilled during execution of the stage of the monitored process.

5. The method according to claim 1, which comprises using a signal that starts the monitored process to prompt an error signal generator to perform the step of generating the error signal.

6. The method according to claim 1, which comprises:

using an error signal generator to perform the step of generating the error signal;

providing a control signal that is output by a control device that controls the monitored process; and using the control signal to prompt the error signal generator to perform the step of discontinuing to generate the error signal.

7. The method according to claim 1, which comprises:

using an error signal generator to perform the step of generating the error signal;

providing control signals that are output by a control device that controls the monitored process;

using the control signals to prompt the error signal generator to perform the step of discontinuing to generate the error signal; and subjecting the control signals to an AND function before using the control signals to prompt the error signal generator.

8. The method according to claim 1, which comprises:

performing the step of generating at least one error signal such that a plurality of error signals are generated; and subjecting the plurality of error signals to an OR function to form a combined error function that is common to all stages of the monitored process.

9. The method according to claim 1, wherein the monitored process is a process selected from the group consisting of programming a flash memory and erasing a flash memory.

10. An apparatus for monitoring an automatically proceeding process to ensure that the process is properly executed, the apparatus comprising:

an error signal generator configured to generate, at the beginning of a monitored automatically proceeding process, at least one error signal to indicate an error, even if there is no error;

said error signal generator configured to discontinue generating the error signal if the error intended to be indicated by the error signal has not occurred.

11. The apparatus according to claim 10, wherein said error signal generator includes at least one flip-flop.

* * * * *